US012161602B1

(12) United States Patent
Fougnies et al.

(10) Patent No.: US 12,161,602 B1
(45) Date of Patent: Dec. 10, 2024

(54) HYDROTHERAPY SYSTEM

(71) Applicant: Nightlight Coldwater LLC, Gilbert, AZ (US)

(72) Inventors: Douglas V. Fougnies, Gilbert, AZ (US); Michael Q. Abbey, Scottsdale, AZ (US); Daniel J. Jewell, Laveen, AZ (US); Darin C. Lewandowski, Phoenix, AZ (US)

(73) Assignee: NIGHTLIGHT COLDWATER LLC, Gilbert, AZ (US)

( * ) Notice: Subject to any disclaimer, the term of this patent is extended or adjusted under 35 U.S.C. 154(b) by 0 days.

(21) Appl. No.: 18/218,755

(22) Filed: Jul. 6, 2023

Related U.S. Application Data

(60) Provisional application No. 63/358,990, filed on Jul. 7, 2022.

(51) Int. Cl.
*A61H 33/00* (2006.01)

(52) U.S. Cl.
CPC ......... *A61H 33/0087* (2013.01); *A61H 33/00* (2013.01); *A61H 33/0095* (2013.01); *A61H 2201/0214* (2013.01)

(58) Field of Classification Search
CPC ............ A61H 33/00; A61H 2201/0214; A61H 33/60–33/6094
See application file for complete search history.

(56) References Cited

U.S. PATENT DOCUMENTS

| | | | | |
|---|---|---|---|---|
| 4,788,992 | A * | 12/1988 | Swainbank | B08B 3/123 134/1 |
| 6,393,843 | B2 | 5/2002 | Kohout | |
| 6,473,915 | B1 | 11/2002 | Davis et al. | |
| 6,892,952 | B2 * | 5/2005 | Chang | E03C 1/0409 236/94 |
| 6,976,052 | B2 * | 12/2005 | Tompkins | G05D 23/1931 709/201 |
| 7,076,814 | B2 * | 7/2006 | Ostrowski | E03C 1/00 4/541.1 |
| 7,828,831 | B1 | 11/2010 | Tanhehco et al. | |
| 8,393,019 | B1 | 3/2013 | Cavuoti | |
| 8,453,275 | B2 * | 6/2013 | May | A61H 33/005 4/507 |
| 10,485,696 | B2 | 11/2019 | Chiu et al. | |

(Continued)

FOREIGN PATENT DOCUMENTS

| | | |
|---|---|---|
| CN | 2779304 Y | 5/2006 |
| CN | 110063834 A | 7/2019 |

(Continued)

OTHER PUBLICATIONS

Jacuzzi, Fuzion® 7242 Drop-in Bath, https://www.jacuzzi.com/en-us/fuzion-7242-drop-in-bath/FUD7242.html (Year: 2024).*

*Primary Examiner* — Jonathan T Kuo
(74) *Attorney, Agent, or Firm* — Panitch Schwarze Belisario & Nadel LLP

(57) ABSTRACT

A hydrotherapy system can include a tub of tempered water, a cold water tank, and a refrigeration system. The system cools the water in the tub following initial immersion of the patient by using valving in conjunction with a transfer pump allowing blending of the cold water from the cold water tank with the tempered water of the tub to gradually begin the therapy process.

16 Claims, 9 Drawing Sheets

(56) References Cited

U.S. PATENT DOCUMENTS

| | | | | |
|---|---|---|---|---|
| 10,765,266 | B2 | 9/2020 | Stout | |
| 2001/0029407 | A1 * | 10/2001 | Tompkins | G05D 23/20 700/282 |
| 2003/0125842 | A1 * | 7/2003 | Chang | E03C 1/055 700/282 |
| 2004/0154094 | A1 * | 8/2004 | Ostrowski | E03B 7/04 4/541.1 |
| 2009/0178192 | A1 * | 7/2009 | Vassilev | G05D 23/1393 4/668 |
| 2010/0223721 | A1 * | 9/2010 | May | A61H 33/02 4/541.1 |
| 2018/0021166 | A1 * | 1/2018 | Rose | A61H 33/0095 607/104 |
| 2020/0000627 | A1 | 1/2020 | Diller et al. | |
| 2021/0341230 | A1 * | 11/2021 | Ludlaim | A61H 35/02 |

FOREIGN PATENT DOCUMENTS

| | | | |
|---|---|---|---|
| CN | 107898357 | B | 7/2020 |
| CN | 111466805 | A | 7/2020 |
| WO | 2016/156672 | A1 | 10/2016 |

* cited by examiner

HYDROTHERAPY SYSTEM

CROSS-REFERENCE TO RELATED APPLICATIONS

This application claims priority to U.S. Provisional Patent Application No. 63/358,990, filed on Jul. 7, 2022, entitled "Hydrotherapy System," the entire contents of which are incorporated by reference herein.

BACKGROUND

Embodiments described herein relate generally to therapeutic tubs, and more particularly, to hydrotherapy tubs that can quickly change a temperature of the water from a temperature suitable for bath water to a temperature suitable for cold water therapy.

Cold water therapy (e.g., cold water immersion) is a well-known human treatment method for a variety of medical conditions. Most of these therapies involve immersing the body in 50°-59° Fahrenheit (F) water for a period of 5-20 minutes. To achieve the proper temperature, one may simply dump ice into a tub of water, or invest in a specialized cold plunge tub/tank, which typically uses a refrigerant system to cool the water to the appropriate temperature. These conventional methods have significant disadvantages. For example, the use of ice is extremely inconvenient due to cost, storage, transportation, and weight issues. Also, most people do not want to enter an extremely cold tub of water.

Most cold plunge tubs only cool the water. The average temperature of cold-only tap water in the U.S. is about 50° F., so a cold plunge tub located in a home and filled with tap water may simply need to maintain the initial tap water temperature against warming due to the human body and ambient air. However, the average temperature of cold-only tap water in the U.S. varies greatly by geographic location and season, and can be in the 40's in northern climates during the winter, and 70°-80° in southern states during the summer. For example, the cold-only tap water in Phoenix, AZ is about 80° F., so this water needs to be cooled significantly to reach the desired temperature for cold water therapy.

Some tubs/baths allow for hot and cold adjustments in a range of 42°-104° F. However, such tubs/baths require a significant amount of time to change the temperature. The average bath water temperature is 1°-2° F. higher than normal body temperature of 98.6° F., which means the average bath water temperature should be about 100°-102° F. A tub that can provide hot and cold adjustments will take a very long time, typically hours, to cool down from a comfortable bath temperature of 100°-102° F. to a suitable temperature for cold water therapy of 50°-59° F. Thus, assuming that one of these tubs is initially warmed up to 100°-102° F., a person enters the tub, and sets the temperature control to lower the temperature to the suitable temperature for cold water therapy of 50°-59° F., a very long time will elapse until this temperature is reached. Even if such a tub is initially filled with 80° tap water, which is available in many southern climates of the U.S., it will still take hours to cool such water down to a suitable temperature of 50°-59° F. for cold water therapy.

It is desirable to provide a hydrotherapy system that allows for rapid temperature change from a temperature suitable for bath water to a temperature suitable for cold water therapy. Ideally, such a system would be capable of completing the temperature change in about 1-5 minutes, and more ideally, 3-5 minutes to minimize discomfort.

BRIEF SUMMARY

Briefly stated, one embodiment comprises a hydrotherapy system including a tub having a rim at least partially surrounding an upper edge of a bowl, one or more fill jets in fluid communication with the bowl, a return opening formed in the tub and in fluid communication with the bowl, a return line in fluid communication with the return opening, a cold water tank, a cold water intake in fluid communication with the cold water tank, a transfer pump having an inlet configured to be in variable fluid communication with the return line and the cold water intake and an outlet configured to be in fluid communication with the one or more fill jets, and at least one mixing valve located upstream of the transfer pump and configured to control a first flow rate through the return line and a second flow rate through the cold water intake such that the first flow rate and the second flow rate constitute a total flow rate reaching the inlet of the transfer pump.

Another embodiment comprises a method for operating a hydrotherapy system. The hydrotherapy system includes a tub containing water, one or more fill jets in fluid communication with the tub, a return opening in fluid communication with the tub, a return line in fluid communication with the return opening, a cold water tank containing water at a lower initial temperature than a starting temperature of the water in the tub, a cold water intake in fluid communication with the cold water tank, a transfer pump having an inlet and an outlet in fluid communication with the one or more fill jets, at least one mixing valve upstream of the transfer pump, and a controller. The method includes receiving, by the controller, operating parameters. The operating parameters include at least a final temperature for the water in the tub and a holding time for maintaining the final temperature. The method also includes operating, by the controller until the final temperature is reached, the at least one mixing valve to adjust a first flow rate from the return line to the inlet of the transfer pump and a second flow rate from the cold water intake to the inlet of the transfer pump based at least on the operating parameters, positioning, by the controller upon the final temperature being reached, the at least one mixing valve to prevent flow from the cold water intake to the inlet of the transfer pump and allow only flow from the return line to the inlet of the transfer pump, and notifying a user, by the controller upon expiration of the holding time, that the holding time has expired.

Yet another embodiment comprises a method for treating a patient with cold water therapy. The method includes entering, by the patient, a tub containing water having a starting temperature between about 80° F. and about 102° F., immersing at least a portion of the body of the patient in the water contained by the tub, and lowering the temperature of the water in the tub to between about 50° F. and about 59° F. by blending water returned directly from the tub with chilled water from a cold water tank and introducing the blended water into the tub. The chilled water has a temperature between about 36° F. and about 40° F. The method further includes remaining, by the patient, in the tub with the at least a portion of the body immersed in the water contained by the tub for a period of time while maintaining the temperature of the water between about 50° F. and about 59° F.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1:
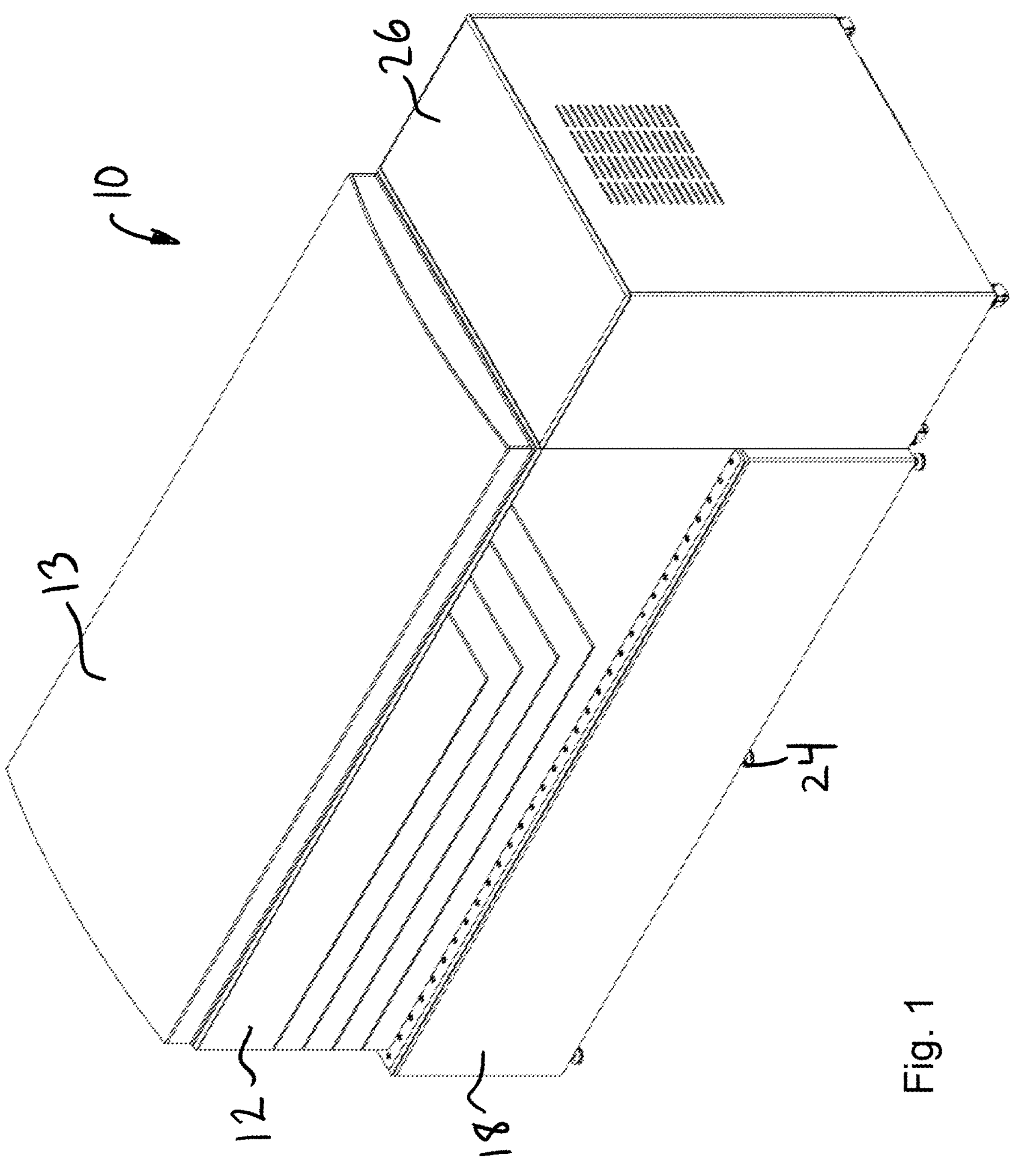
FIG. 1 is a front, left side perspective view of a hydrotherapy system in accordance with a first example embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
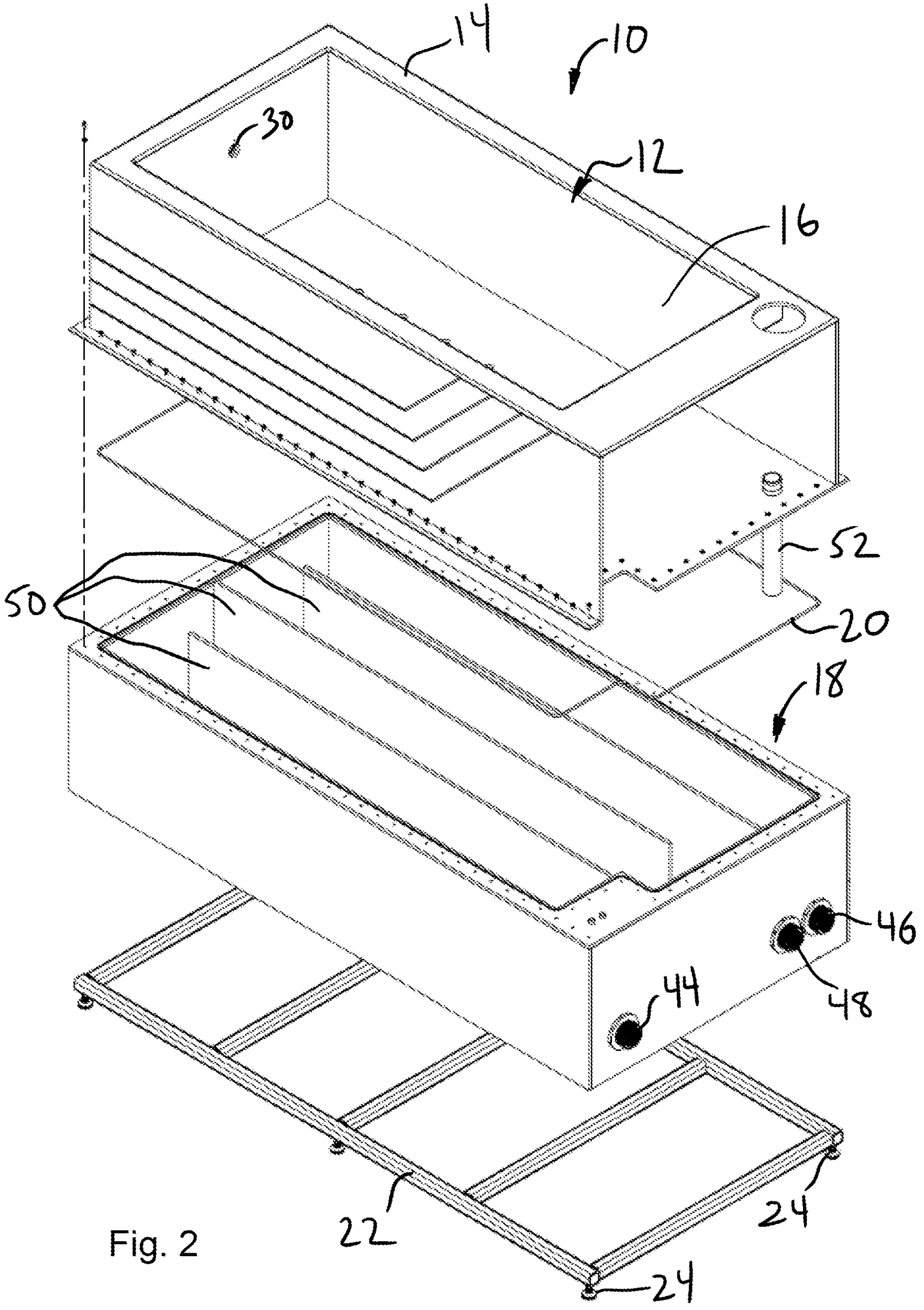
FIG. 2 is a partial, front, left side perspective exploded view of the hydrotherapy system of FIG. 1.

Referring to FIGS. 1 and 2, there is shown a hydrotherapy system 10 including a tub 12 that may have a rim 14 at least partially surrounding an upper edge of a bowl 16 shaped and configured to contain water (not shown). A patient (not shown) may enter the tub 12 for immersing at least a portion of his or her body in the water contained by the tub 12 within the bowl 16. The tub 12 shown in FIG. 1 has a capacity of approximately 190 gallons, but the tub 12 may have any capacity suitable for at least partial immersion of a patient's body, for example, between about 25 gallons to about 300 gallons. The main body of the tub 12 may be formed from any suitable material, such as metal, ceramic, plastic, combinations thereof, or the like. The tub 12 may include a lid 13 attached thereto. In some embodiments, the lid may be insulative to allow for maintaining the water in the tub 12 at a preferred temperature when not in use and/or during start-up operations. In other embodiments, the lid 13 may be omitted.

The tub 12 may be in fluid communication with a cold water tank 18 configured to hold water to be chilled and at least partially transferred to the tub 12 at a designated time. In the example shown in FIGS. 1 and 2, the tub 12 sits atop the cold water tank 18, but other configurations of the tub 12 and the cold water tank 18 may be used as well. For example, the tub 12 and cold water tank 18 may sit side-by-side, end-to-end, or the like. In addition, some embodiments may allow for the tub 12 and the tank 18 to be physically separated from one another except for plumbing and/or electrical connections. For example, the tub 12 may be located in one room while the cold water tank 18 may be located in another (e.g., basement, attic, closet, or the like), or the cold water tank 18 may be built into a wall, floor, or the like. In the example shown in FIG. 2, a bottom surface of the tub 12 forms a top closure of the cold water tank 18, such that a seal 20 may be placed between the tub 12 and the cold water tank 18 to prevent, for example, leakage of water held within the cold water tank 18. In a similar embodiment, the cold water tank 18 may have its own top closure and seal (not shown) such that a sealing between the tub 12 and the cold water tank 18 may not be necessary.

The cold water tank 18 shown in FIG. 1 has a capacity of approximately 280 gallons, but the cold water tank 18 may have any desired capacity. Preferably, the cold water tank 18 will have a higher capacity than the tub 12 due to the nature of the water exchange between the two that will be described in further detail below. The cold water tank 18 may be made from any appropriate material, such as metal, ceramic, plastic, combinations thereof, or the like. When possible, the cold water tank 18 may be made from insulative material and/or contain insulation (not shown) to minimize heat transfer between ambient air and the water held within the cold water tank 18.

As best seen in FIG. 2, the tub 12 and/or the cold water tank 18 may be supported by a frame 22. In preferred embodiments, the frame 22 may include leveling feet 24 to allow for level installation of the hydrotherapy system 10. The frame 22 may be made from a durable material, such as stainless steel or the like, for supporting the weight of the tub 12 and/or the cold water tank 18 along with the water held therein. In some other embodiments, the tub 12 and/or cold water tank 18 may have a frame integrated therein, and leveling feet 24 may be directly mounted to the tub 12 and/or the cold water tank 18.

A service cabinet 26 is shown in FIG. 1 attached to the tub 12 and the cold water tank 18. The service cabinet 26 may house various plumbing and electronics components, as will be described in further detail below, and may be movable relative to the tub 12 and/or cold water tank 18 to an open configuration (see e.g., FIG. 3) to allow for access to those components for operation and/or maintenance. In some embodiments, the service cabinet 26 may be attached to only one of the tub 12 and the cold water tank 18. In some other embodiments, each of the tub 12 and cold water tank 18 may include their own respective service cabinets. In yet other embodiments, the service cabinet 12 may be physically separate from both the tub 12 and the cold water tank 18. In still other embodiments, plumbing and/or electronic components may be provided within the tub 12 and/or the cold water tank 18 themselves and accessible via access panel(s)

(not shown). In such instances, a service cabinet 26 may be omitted altogether, although in some embodiments the plumbing and/or electronic components may be distributed in multiple locations necessitating both incorporated access panels on the tub 12 and/or cold water tank 18 and a separate service cabinet 26.

Figure 3:
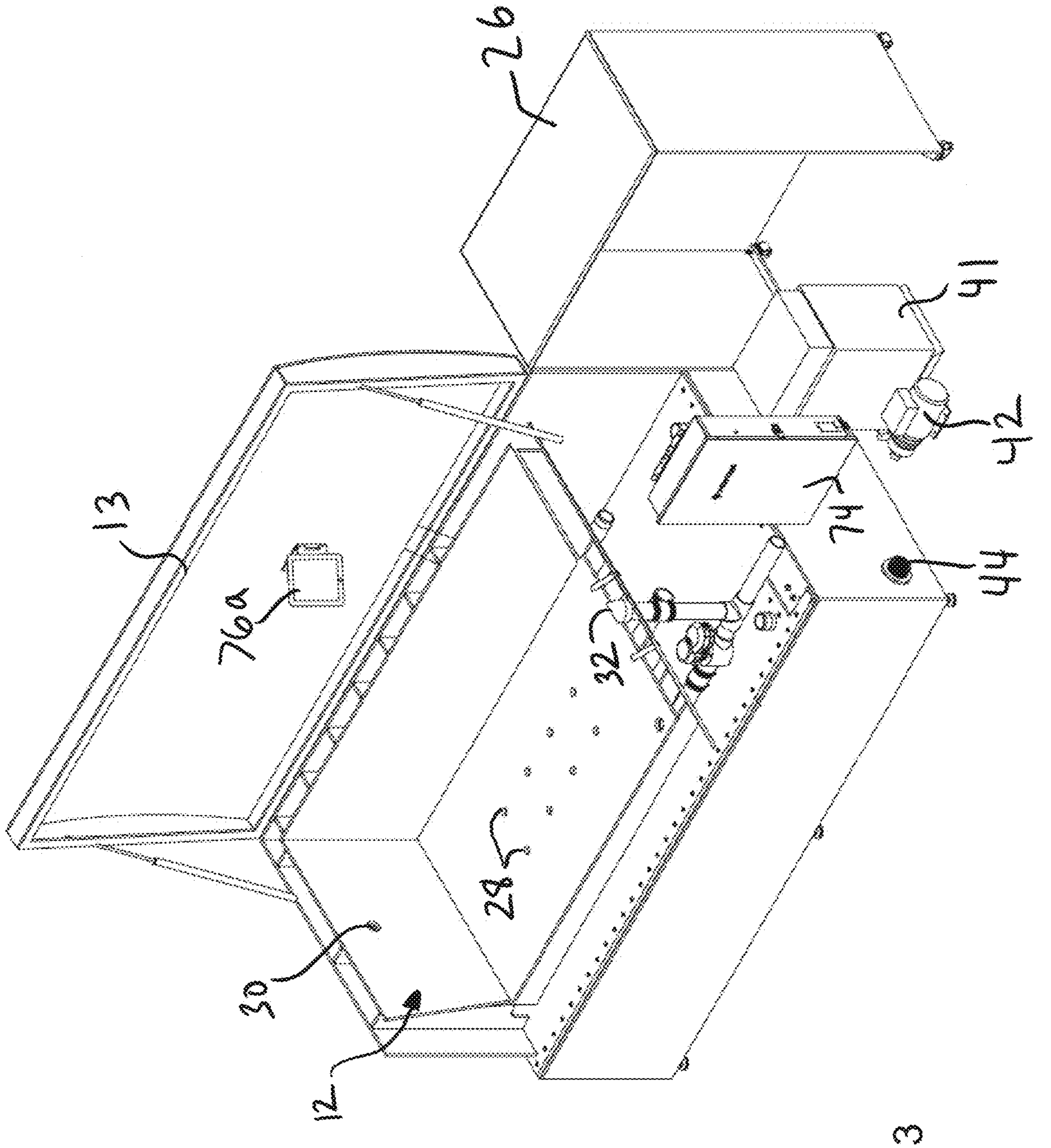
FIG. 3 is a partial, front, left side perspective cut-away view of the hydrotherapy system of FIG. 1 with a service cabinet thereof in an open configuration.
Figure 4:
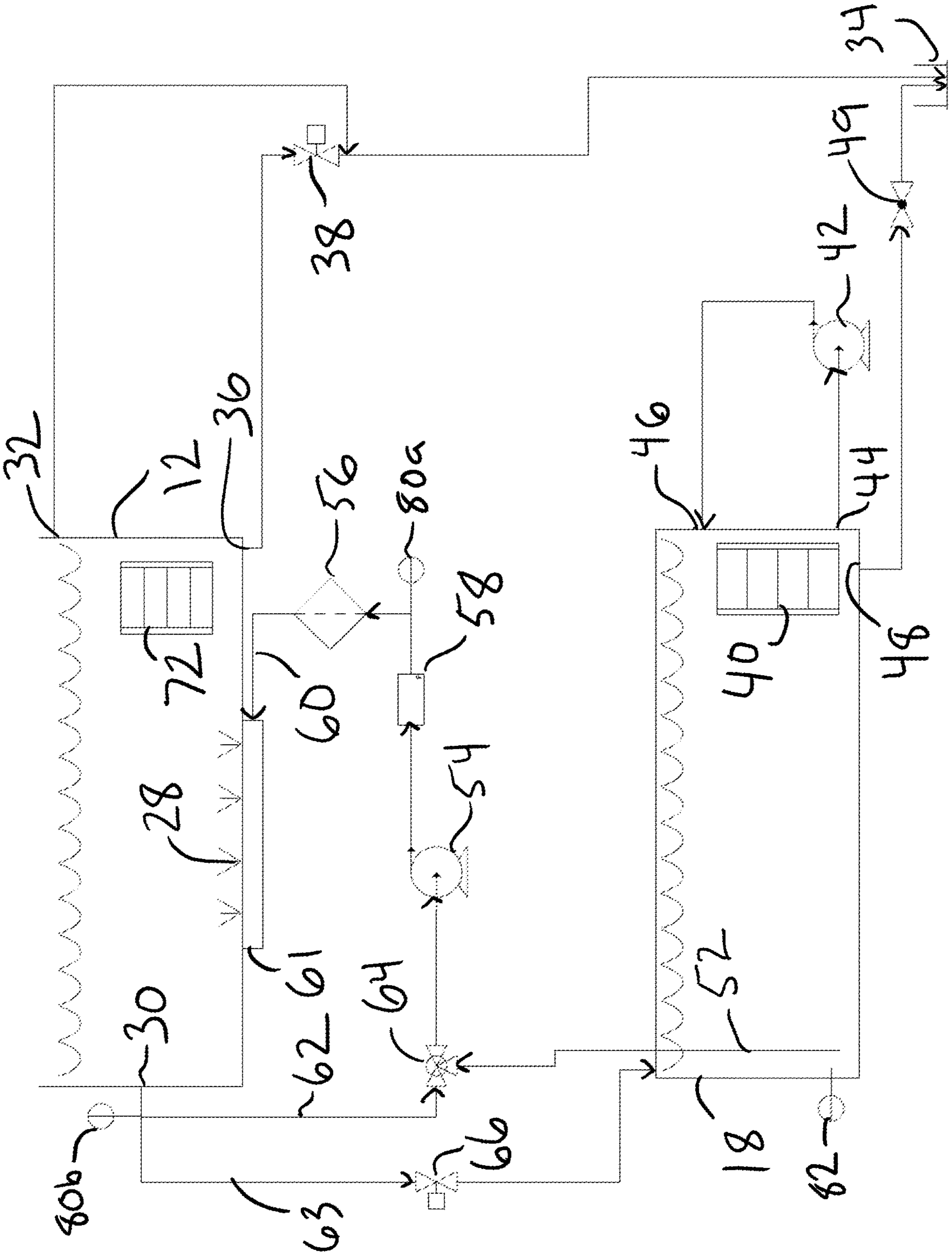
FIG. 4 is a schematic block diagram of at least a portion of the plumbing of the hydrotherapy system of FIG. 1.

Referring to FIGS. 3 and 4, water may enter the tub 12 via one or more fill jets 28 that may be in fluid communication with the bowl 16. In the example shown, a plurality of jets 28 are arranged at a bottom of the bowl 16 in the tub 12. However, in alternate embodiments, the jet(s) 28 may be disposed on one or more side walls of the bowl 16. In still further embodiments, jets 28 may be distributed among multiple locations within the bowl 16, including on the sidewalls and the bottom. The tub 12 may further include at least one return opening 30 formed therein and in fluid communication with the bowl 16. In the example of FIGS. 3 and 4, the return opening 30 is shown disposed within an upper portion of one of the side walls of the bowl 16. In some embodiments, multiple return openings 30 may be disposed at various locations around the bowl 16. The tub 12 may further include a maximum fill height opening 32, which may be located just below the rim 14. The maximum fill height opening 32 is preferably configured to prevent water from reaching a level higher than the rim 14 and spilling over. The maximum fill height opening 32 may connect to a facility drain 34 (e.g., a main drain, sewer line, septic tank, or the like). In some other embodiments, at least some of the water entering the maximum fill height opening 32 may be recirculated elsewhere within the system rather than being drained completely from the system 10.

The tub 12 may further include an emergency drain opening 36, preferably located at a bottom of the bowl 16 to enable as much water from the tub 12 as possible to enter the emergency drain opening 36 when necessary. The emergency drain opening 36 may connect to the facility drain 34. An emergency draining operation may be implemented through actuation of an emergency drain valve 38 such that when the emergency drain valve is in an open position, water inside the bowl 16 may enter the facility drain 34 through the emergency drain opening 36. The emergency drain valve 38 may be a solenoid valve that can be operated electrically, either in response to a request from a user or automatically in response to a detected condition. In the particular example shown, the emergency drain valve 38 may be a normally open valve, requiring power to be closed. In this manner, a loss of power can serve as an emergency condition resulting in draining of the tub 12. The emergency drain valve 38 may also be operable manually as an override, such as by a handle (not shown) or the like. In some embodiments, the emergency drain valve 38 is only manually operable. In still other embodiments, the emergency drain opening 36 may be closed by a stopper (not shown) or other like closure that can be manually moved or removed to allow draining of the water. In yet other embodiments, the tub 12 utilizes both a stopper and the emergency drain valve 38 for preventing water drainage prior to an emergency draining operation.

The cold water tank 18 is preferably configured to hold cold water (e.g., water that, when the system 10 is ready for use, will generally be lower in temperature than the water in the tub 12). When the hydrotherapy system 10 is in operation, water from the cold water tank 18 will be circulated to the tub 12. To chill the water in the cold water tank 18, a chilling element 40 (FIG. 4), such as a chilling coil or the like, may be provided at least partially disposed within the cold water tank 18. The chilling element 40 may be part of a chiller unit 41, components of which may be located within the service cabinet 26 (or elsewhere, as desired). The chiller unit 41 shown in FIG. 3 is a 36,000 BTU chiller, but the specifications for the chiller unit 41 may vary depending on the capacity of the cold water tank 18 and the desired cooling speed. A chiller pump 42 may circulate water from the cold water tank 18 via a chiller flow outlet 44 and a corresponding chiller flow inlet 46 (FIG. 2) to circulate the water past the chilling element 40. The chiller pump 42 may be an 8.5 gallons per minute (GPM) water pump, but the specifications for the chiller pump 42 may vary depending on the capacity of the cold water tank 18 and the desired pumping speed. The chiller flow outlet 44 and inlet 46 may be disposed on the same side wall or different side walls from one another, or in other locations on the cold water tank 18. In an alternative embodiment, the chilling element 40 may be located externally of the cold water tank 18 such that water is pulled from the cold water tank 18 by the chiller pump 42 and chilled externally before being returned to the cold water tank 18 via the chiller flow inlet 46. The chiller unit 41 preferably is configured to reduce a temperature of the water in the cold water tank 18 to just above freezing, e.g., about 36°-40° F. (to prevent icing), although other temperatures may be set, as desired. The cold water tank 18 may further include a drain opening 48 (FIG. 2) that can connect to the facility drain 34 and may be operable via an emergency valve 49. The emergency valve 49 may be a manual valve, although electronic types of valves (e.g., solenoid valve, or the like) may be used as well.

As can be seen in FIG. 2, the cold water tank 18 may contain a plurality of dividing plates 50 that are arranged to form a labyrinth within the cold water tank 18. For example, the dividing plates 50 are alternately attached to opposing side walls of the cold water tank 18 to form a winding path such that the chiller flow inlet 46 is disposed at one end of the winding path and the chiller flow outlet 44 is disposed at an opposing end of the winding path. This labyrinth enables more efficient chilling of the water in the cold water tank 18. For example, the chilling element 40 may be placed adjacent to the chiller flow inlet 46, meaning that the chiller pump 42 is always pulling water from the cold water tank 18 at a distance within the labyrinth furthest from the chilling element 40. The dividing plates 50 may be attached or otherwise sealed to a bottom interior surface within the cold water tank 18 and may have a height extending therefrom that is greater than a maximum water level for the cold water tank 18. Other arrangements may be used as well.

Water from the cold water tank 18 is intended to be circulated to the tub 12 to reduce the temperature of water in the tub 12, particularly after the patient is already immersed therein. A cold water intake 52 may be provided that extends into the cold water tank 18 for fluid communication therewith to withdraw water under the influence of a transfer pump 54. As will be explained in further detail below, the transfer pump 54 may include an inlet that is configured for variable fluid communication with the return opening 30 (e.g., via a return line 62) and the cold water intake 52, as well as an outlet configured for fluid communication with the fill jet(s) 28. The transfer pump 54 may be a 110 GPM water pump, but the specifications for the transfer pump 54 may vary depending on the capacities of tub 12 and the cold water tank 18 and the desired transfer speed. Water drawn through the cold water intake 52 may be passed through a filter 56, such as a cartridge filter or other type of conventional water filter. The water may also be passed through an optional ionizer 58 provided for sanitizing. The ionizer 58 may be a copper and/or silver ionizer, which releases ions into the water via electrolysis to eliminate bacteria, algae, and the like. In some embodiments, the ionizer 58 may be replaced by an inline chlorinator or other type of conventional water sanitizer. While the filter 56 and the ionizer 58 are both shown downstream of the transfer pump 54 in FIG. 4, other arrangements of the components can be used as well, including omission of one or more of the filter 56 and ionizer 58. Water sanitizing can also be implemented for the tub 12 using methods not involving in-line techniques (e.g., a floating chlorinator or the like), if desired.

Following optional filtration and/or sanitizing, the transfer pump 54 moves the water toward a fill outlet 60 in fluid communication with the one or more jets 28 in the tub 12. In the embodiment shown in the drawings, the fill outlet 60 couples with a dispersing tray 61 located beneath the tub 12. The dispersing tray 61 feeds water to all of the jets 28 located at the bottom of the tub 12. However, in other embodiments, the fill outlet 60 may couple to an individual jet 28 or branch into multiple outlet pipes (not shown) that individually connect with respective jets 28.

The transfer pump 54 may also be used to recirculate and potentially filter and/or sanitize water within the tub 12. The return opening 30 of the tub 12 may be in fluid communication with a return line 62. At least one mixing valve 64 may be located upstream of the transfer pump 54 and may be configured to control flow rates through the return line 62 and the cold water intake 52. The mixing valve 64 shown in this example is a single, three-way valve that can be electronically actuated, as will be explained in further detail below, and is connected to both the return line 62 and the cold water intake 52. However, in other embodiments, the mixing valve 64 may comprise multiple electronically actuatable valves, such as one disposed on the return line and another, separate valve disposed on the cold water intake 52. As a result of the at least one mixing valve 64, water drawn from the tub 12 via the return line 62 and water drawn from the cold water tank 18 via the cold water intake 52 may be blended before proceeding to the inlet of the transfer pump 54 along the flow path described above. Relative flow rates of the cold water drawn from the cold water tank 18 and the water returned from the tub 12, which together may constitute a total flow rate reaching the inlet of the transfer pump 54, may be controlled by varying the position(s) of the mixing valve(s) 64. Preferably the mixing valve 64 includes a plurality of positions such that various flow rate combinations may be achieved depending on the needs of the system (e.g., how fast to chill the water in the tub 12, and the like). In addition, the mixing valve 64 may preferably include positions to completely shut off one of the cold water from the cold water tank 18 (such as where the hydrotherapy system 10 is simply recirculating water from the tub 12) or the return water from the tub 12 (such as where maximum cooling of the water in the tub 12 may be desired).

To avoid overfilling the tub 12 while chilling the water, some of the water entering the return opening 30 may be diverted away from the return line 62 and into a tank line 63 in fluid communication with the cold water tank 18 for the purpose of leading the returned water to the cold water tank 18. Flow within the tank line 63 may be controlled via a balance valve 66, which may be an electronically actuated valve (e.g., a solenoid valve or the like), although a manual valve may be used as well. Preferably, a selected position of the balance valve 66 correlates to a respective position of the mixing valve 64 so that the flow rate to the cold water tank 18 via the tank line 63 is substantially equal to the flow rate of cold water from the cold water intake 52 through the mixing valve 64. This configuration should obtain a constant water level within the tub 12 while the water in the tub 12 is being cooled during normal operation. In other embodiments, mixing and flow rates can also or alternatively be controlled by varying the pumping rate of the transfer pump 54.

For some operations (examples of which will be explained in more detail below), it may be desirable to merely recirculate water within the tub 12. In the example shown in the drawings, the balance valve 66 would be closed and the mixing valve 64 would be in a position to prevent receipt of water from the cold water intake 52. In this manner, water drawn into the return opening 30 under the influence of the transfer pump 54 is fed back to the jet(s) 28. Recirculation can be performed, for example, during heating of the water in the tub 12. For this purpose, a heating element 72, such as a heating coil, may be provided within the tub 12 to heat the water as it circulates, although in alternative embodiments, the heating element 72 may be placed inline (e.g., upstream or downstream of the transfer pump 54 or the like). In alternative embodiments, heating and/or recirculation may utilize equipment separate from the transfer pump 54 and/or associated plumbing.

The heating element 72 may belong to a stand-alone heating unit (not shown). However, it can be advantageous and efficient to utilize the condenser components (not shown) of the chiller unit 41 as a heater. For example, while the chiller unit 41 is operating to chill the water in the cold water tank 18, condenser-generated heat can be passed to recirculating water from the tub 12 via a heat exchanger or the like. When water in the tub 12 reaches the desired heated temperature, condensing by the chiller unit 41 may be switched to an air coil (not shown) or the like to allow further operation of the chiller unit 41 without impacting the temperature of water in the tub 12.

Figure 5:
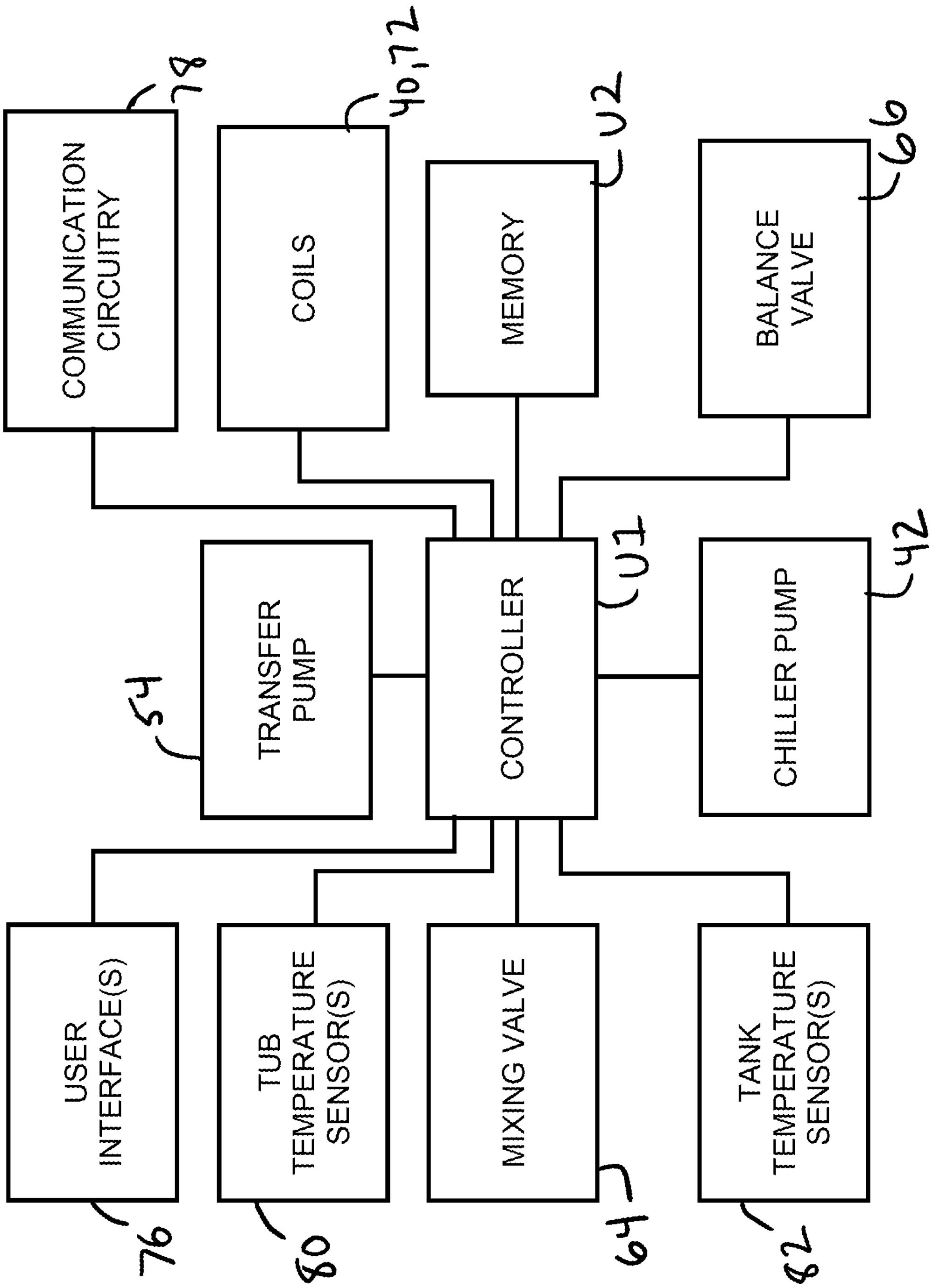
FIG. 5 is a schematic block diagram of communicative coupling of at least some of the components that may be used with the hydrotherapy system of FIG. 1.

Referring to FIGS. 3 and 5, a system control panel 74 may be provided for controlling operation of the hydrotherapy system 10. The system control panel 74 may be located on and/or within the service cabinet 26, although other mounting or housing locations may be used as well. Moreover, while the system control panel 74 is shown in FIG. 3 as being mounted at one location (in the service cabinet), the system control panel 74 may be distributed among multiple locations, as necessary. The system control panel 74 may include at least one controller U1, which may be a microcontroller unit (MCU), a central processing unit (CPU), a microprocessor, an application specific controller (ASIC), a programmable logic array (PLA), combinations thereof, or the like. The controller U1 may include or be coupled to a memory U2 that may store code or software for carrying out processes described herein and/or carrying out other operations of the hydrotherapy system 10 and may store any captured data for later transfer to remote or external devices via communication circuitry 78. The communication circuitry 78 may include one or more of circuitry configured to communicate over one or more wired protocols, such as USB, Ethernet, IEEE 1394, or the like, and/or one or more wireless protocols, such as BLUETOOTH, WI-FI, ZIGBEE, Z-WAVE, 3G, 4G, or 5G cellular, infrared, or the like.

It should be further appreciated that although controller U1 is referred to in this example as a single component, the controller U1 may include a plurality of individual devices, with control functions divided among the individual devices. The controller U1 may be wired or wirelessly connected to components of the hydrotherapy system 10 necessary for carrying out the operations and processes described herein, such as is shown in FIG. 5.

The controller U1 may include or be in communication (either wired or wireless) with one or more user interfaces 76. For example, in FIG. 3, a touch panel 76*a* is shown mounted on an inside of the lid 13. A user may use the touch panel 76*a* to select operation programs, initiate operations, change setpoints, or the like. Alternative types of user interfaces 76 may be used in addition to, or in place of, the touch panel 76*a*. For example, a screen, display, mouse, control pad, microphone, optical sensor, or the like may be provided for receiving touch, audible (e.g., voice-activated), visual (e.g., sensed motion) or other types of inputs from a user. A user interface 76 may be provided on and/or in the control panel 74, elsewhere on and/or in the service cabinet 26, and/or on other suitable locations of the hydrotherapy system 10. In some embodiments, a user interface 76 may be physically separated from the hydrotherapy system 10, such as mounted on a wall, located on a cabinet, or the like, with wired or wireless connection back to the controller U1.

The controller U1 may be in communication with at least one or more of the chiller pump 42 and the transfer pump 54 for controlling at least basic operation thereof (e.g., on/off) although pumping rates (e.g., the volume per unit time for which water passes through the respective pump) may be controlled as well. The controller U1 may also be in communication with various valves within the hydrotherapy system 10 for diverting water toward various locations at appropriate times, such as, but not limited to, the mixing valve 64 and the balance valve 66. To assist with operation of the hydrotherapy system 10, the controller U1 may also be in communication with one or more sensors. For example, in FIG. 5, the controller U1 may receive temperature data from one or more tub temperature sensors 80 and/or one or more tank temperature sensors 82. The one or more tub temperature sensors 80 may be located within or near the tub 12 to measure one or more temperatures affiliated with water in, entering, or leaving the tub 12. For example, a first tub temperature sensor 80*a* may sample water in the hydrotherapy system 10 prior to entering the jets 28 (e.g., between the filter 56 and the ionizer in the example of FIG. 4), while a second tub temperature sensor 80*b* may sample water exiting the tub 12 via the return opening 30. The first and second tub temperature sensors 80*a*, 80*b* therefore respectively assess the temperature of water entering and leaving the tub 12. Meanwhile, in the example of FIG. 4, a tank temperature sensor 82 is shown directly measuring the temperature of water in the cold water tank 18. Other configurations and arrangements of the sensors 80, 82 can be used as well. The temperature sensors 80, 82, may be thermistors, IC temperature sensors, thermocouples, IR temperature sensors, combinations thereof, or the like.

Various operations of the hydrotherapy system 10 will now be described. The controller U1 may be powered on during filling operations, for example, to make sure that the emergency drain valve 38 is closed. The emergency valve 39 for the cold water tank 18 should also be closed, either manually or by the controller U1. It may be desirable to fill the cold water tank 18, first. For example, the cold water tank 18 may be cooled while the tub 12 fills with water. In the example shown in the drawings, the cold water tank 18 can be filled from the tub 12, by opening the balance valve 66 and allowing water to overflow into the cold water tank 18. A "bath fill" operation, selected via a user interface 76, for example, can be used to enable the filling. Indication that the cold water tank 18 is full can be manually observed by a rise in the water level in the tub 12, instead of overflowing into the return opening 30. However, in alternative embodiments, a tank temperature sensor 80 and/or one or more fill level sensors (not shown) may detect a filled condition and allow the controller U1 to report such state via a user interface 76 or the like. Visual inspection of water entering the max fill height opening 32 may visually indicate that the tub 12 is full. Similarly, alternative embodiments may utilize one or more fill height sensors (not shown) to provide an indication to the controller U1.

Figure 6A:
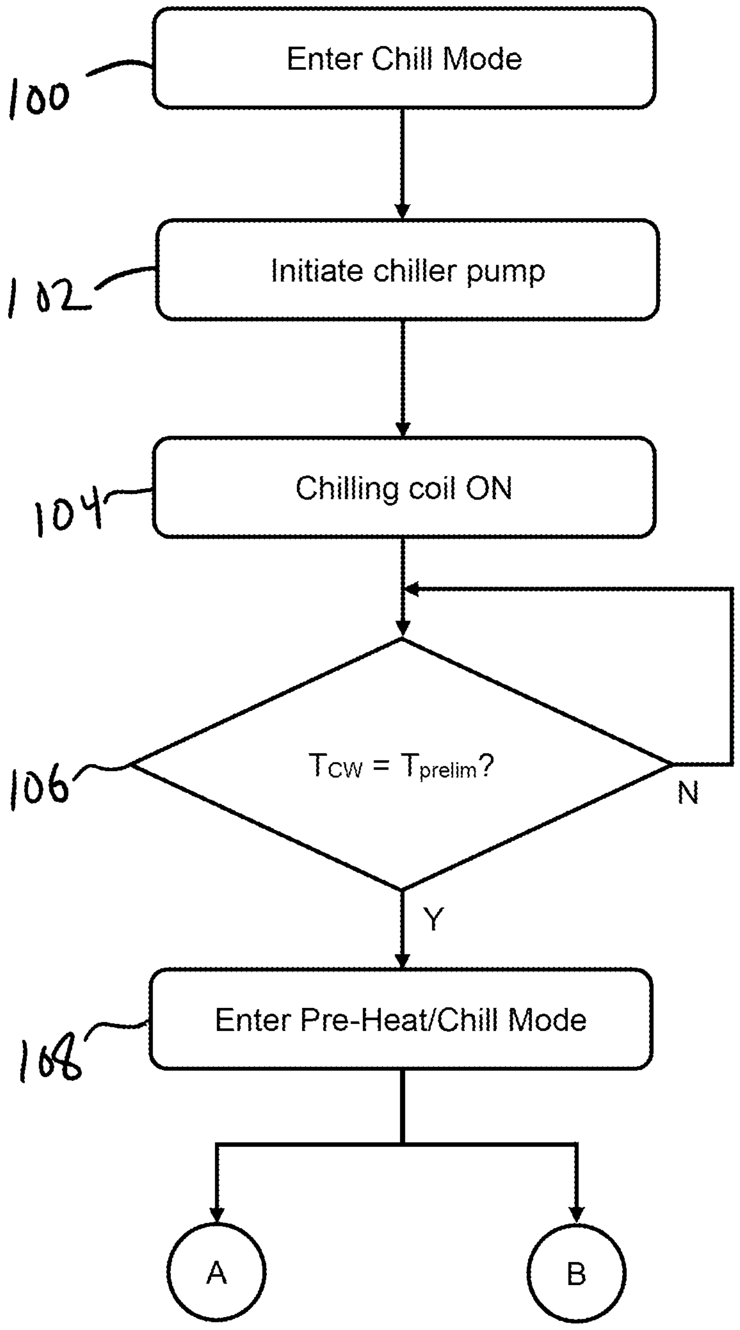
FIGS. 6A-6C constitute a flowchart representing an example method for initial chilling and/or heating of water within the hydrotherapy system of FIG. 1.
Figure 6B:
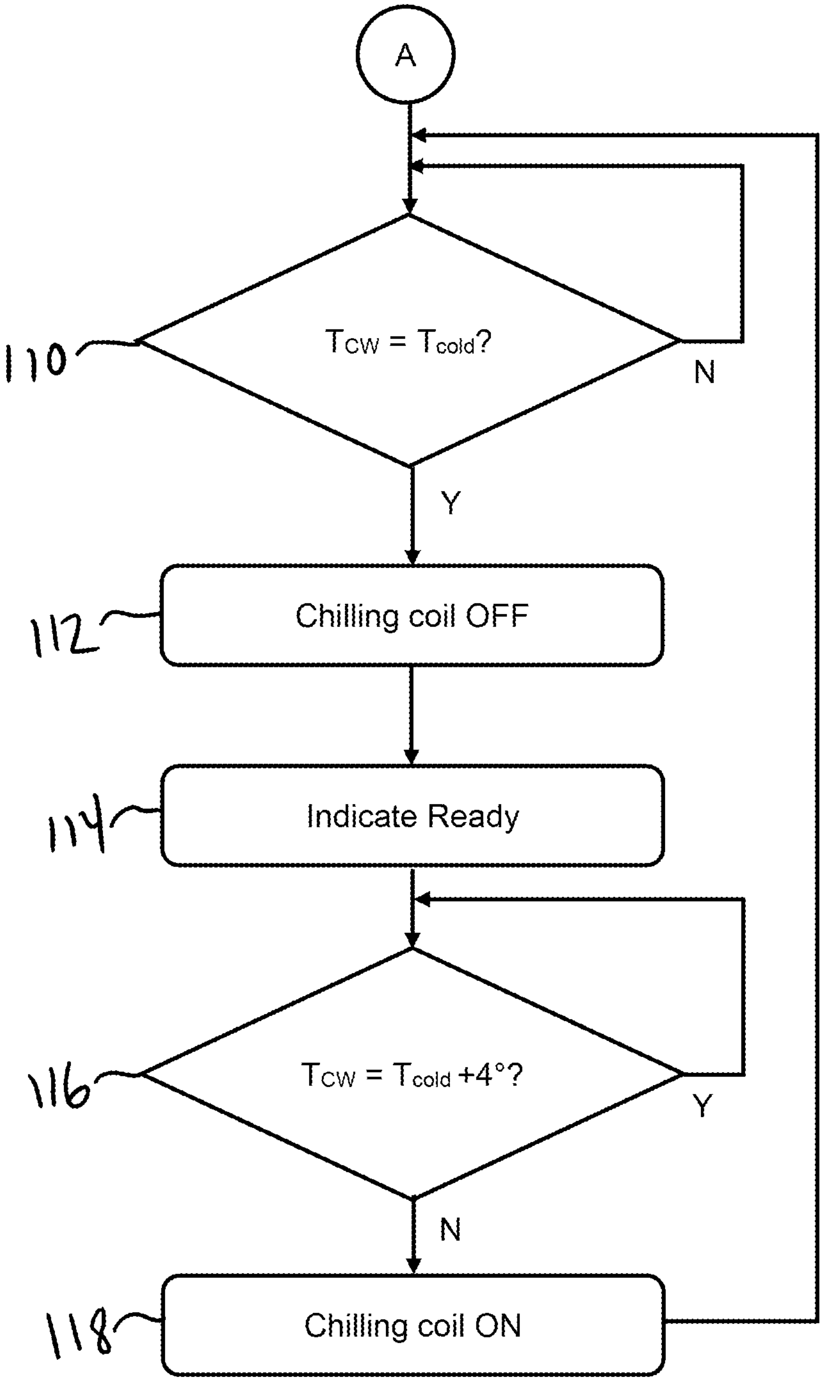
Figure 6C:
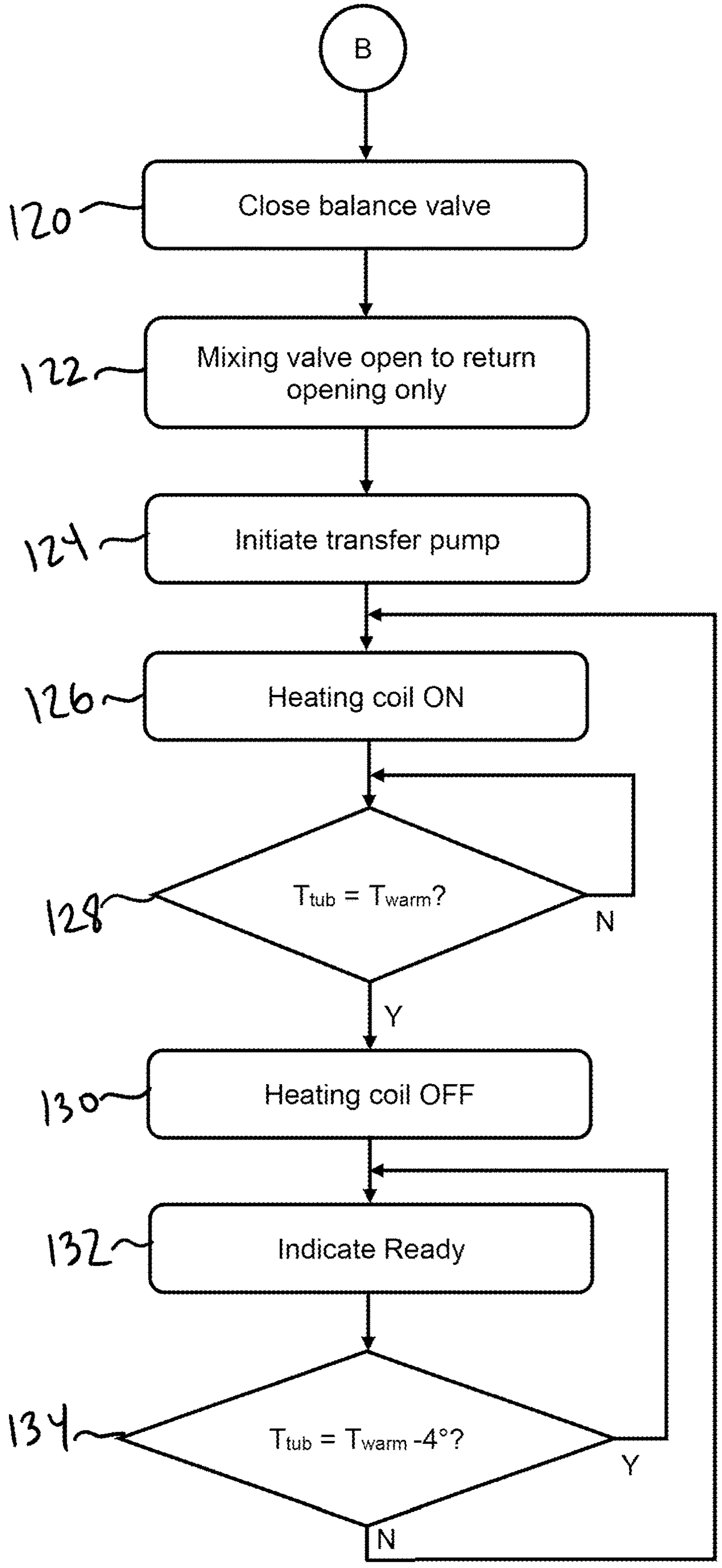

An example preliminary chilling and heating operation is shown in FIGS. 6A-6C. The controller U1 may initially enter a "Chill Mode" at step 100. This may be done in response to receiving an input from a user via a user interface 76, for example. However, entering the Chill Mode may be performed based on an established schedule, in response to detection of a full cold water tank 18, or other like criteria. At step 102, the controller U1 may initiate the chiller pump 42 to circulate water within the cold water tank 18. At step 104, the controller U1 may turn the chilling element 40 on, such as by activating the chiller unit 41, allowing refrigerant into the chilling element 40, or other like operations. Steps 102 and 104 may be performed generally simultaneously, in the sequential order shown in FIG. 6A, or in reverse order.

At step 106, the controller U1 may monitor the temperature $T_{CW}$ of the water in the cold water tank 18, such as by reading data from one or more tank temperature sensors 82, to determine if a preliminary cold temperature $T_{prelim}$ has been reached. The preliminary cold temperature $T_{prelim}$ may be a trigger for initiating circulation and/or heating of the water in the tub 12, and may be set to, for example, 50° F., although other temperatures may be used as well. The chiller pump 42 and chilling element 40 may continue to run until the preliminary cold temperature $T_{prelim}$ is reached. Once the condition in step 106 is satisfied, the controller U1 at step 108 may enter a "Pre-Heat/Chill Mode," where steps may be taken in both the cold water tank 18 and in the tub 12.

For example, at step 110, the controller U1 may now monitor the temperature $T_{CW}$ of the water in the cold water tank 18 to determine if a cold setpoint temperature $T_{cold}$ has been reached. The cold setpoint temperature $T_{cold}$ may be selected or varied by the user, may be a preset value, or the like. For example, the cold setpoint temperature $T_{cold}$ may be 36° F., although other temperatures may be selected, as desired. Once the cold setpoint temperature $T_{cold}$ has been reached, at step 112, the controller U1 may turn the chilling element 40 off, such as by deactivating the chiller unit 41, withdrawing refrigerant from the chilling element 40, or other like operations. The controller U1 may also deactivate the chiller pump 42, if desired, but the chiller pump 42 may also continue to run to keep water circulating within the cold water tank 18. The controller U1 may also indicate at step 114 that the cold water tank 18 is ready for use, if desired.

At step 116, the controller U1 may continue to monitor the temperature $T_{CW}$ of the water in the cold water tank 18 to make sure the water stays at the desired temperature, preferably within a tolerance. For example, the controller U1 may allow the measured temperature $T_{CW}$ of the water in the cold water tank 18 to increase by as much as 4° F. over the cold setpoint temperature $T_{cold}$, although other tolerances (including 0) may be used as well. If the temperature $T_{CW}$ of the water in the cold water tank 18 exceeds the cold setpoint temperature $T_{cold}$ by an undesirable amount, the controller U1 may, at step 118, turn the chilling element 40 back on (and reinitiate the chiller pump 42 if it had previously been shut down) to cool the water in the cold water tank 18 back down to the cold setpoint temperature $T_{cold}$. Although not shown in the figures, if the water in the cold water tank 18 gets too cold, e.g., too far below the cold setpoint temperature $T_{cold}$, water from the tub 12 may be used to raise the temperature, or a separate heating element (not shown) may be provided in the cold water tank 18.

If tub 12 operations are not dependent on an interim temperature like preliminary cold temperature $T_{prelim}$ being reached, step 106 can be omitted and the controller U1 may simply monitor the temperature $T_{CW}$ of the water in the cold water tank 18 in relation to the cold setpoint temperature $T_{cold}$. Similarly, step 108 can be entered in place of step 100 or actuated independently when desired.

On the tub 12 side (FIG. 6C), at step 120, the controller U1 may close the balance valve 66 or confirm that the balance valve 66 is closed (if the balance valve 66 is manually actuatable, the controller U1 may provide notification to the user to close the balance valve 66 if it is detected as being open). At step 122, the controller U1 may also move the mixing valve 64 to a position where only water from the return opening 30 will pass therethrough (i.e., the mixing valve 64 is closed relative to the cold water intake 52) or confirm that the mixing valve 64 is in such position (again, if the mixing valve is manually actuatable, the controller U1 may provide notification to the user to set the mixing valve 64 to the appropriate position). At step 124, the controller U1 may initiate the transfer pump 54 to circulate water within the tub 12. Steps 120, 122, and 124 may be performed generally simultaneously, in the sequential order shown in FIG. 6C, or other varied orders.

In some embodiments, it may be sufficient to simply circulate the tub 12 water, in which case no further steps are required. If heating is required, at step 126, the controller U1 may turn the heating element 72 on, for example by utilizing the condenser from the chiller unit 41, actuating a separate heating unit (not shown), or the like. At step 128, the controller U1 may monitor a temperature $T_{tub}$ of water in the tub 12, such as by reading data from one or more tub temperature sensors 80, to determine if it has reached a warm setpoint temperature $T_{warm}$. For example, the controller U1 may rely on the temperature reading from the tub temperature sensor 80*b* adjacent the return opening 30. However, data from other sensors 80 can be read in the alternative. In other embodiments, data from multiple sensors may be averaged or otherwise combined to measure the temperature $T_{tub}$ of water in the tub 12. The warm setpoint temperature $T_{warm}$ may be selected or varied by the user, may be a preset value, or the like. For example, the warm setpoint temperature $T_{warm}$ may be somewhere in the range of between about 80° F. and about 102° F., although other temperatures may be appropriate, as needed. Once the warm setpoint temperature $T_{warm}$ has been reached, at step 130, the controller U1 may turn the heating element 72 off, such as by switching the condenser method of the chiller unit 41, deactivating a heater unit (not shown), or other like operations. The controller U1 may also deactivate the transfer pump 54, if desired, but the transfer pump 54 may also continue to run to keep water circulating within the tub 12. The controller U1 may also indicate at step 132 that the tub 12 is ready for use, if desired.

At step 134, the controller U1 may continue to monitor the temperature $T_{tub}$ of the water in the tub 12 to make sure the water stays at the desired temperature, preferably within a tolerance. For example, the controller U1 may allow the measured temperature $T_{tub}$ of the water in the tub 12 to decrease by as much as 4° F. below the warm setpoint temperature $T_{warm}$, although other tolerances (including 0) may be used as well. If the temperature $T_{tub}$ of the water in the tub 12 recedes from the warm setpoint temperature $T_{warm}$ by an undesirable amount, the controller U1 may return to step 126 to turn the heating element 72 back on (and reinitiate the transfer pump 54 if it had previously been shut down) to warm the water in the tub 12 back up to the warm setpoint temperature $T_{warm}$. Although not shown in the figures, if the water in the tub 12 gets too hot, e.g., too far above the warm setpoint temperature $T_{warm}$, water from the cold water tank 18 may be used to lower the temperature, or a separate cooling element (not shown) may be provided in the tub 12.

While FIGS. 6A-6C show that chilling and warming operations may be performed generally simultaneously, such operations may be performed sequentially or at least independently of one another.

Figure 7:
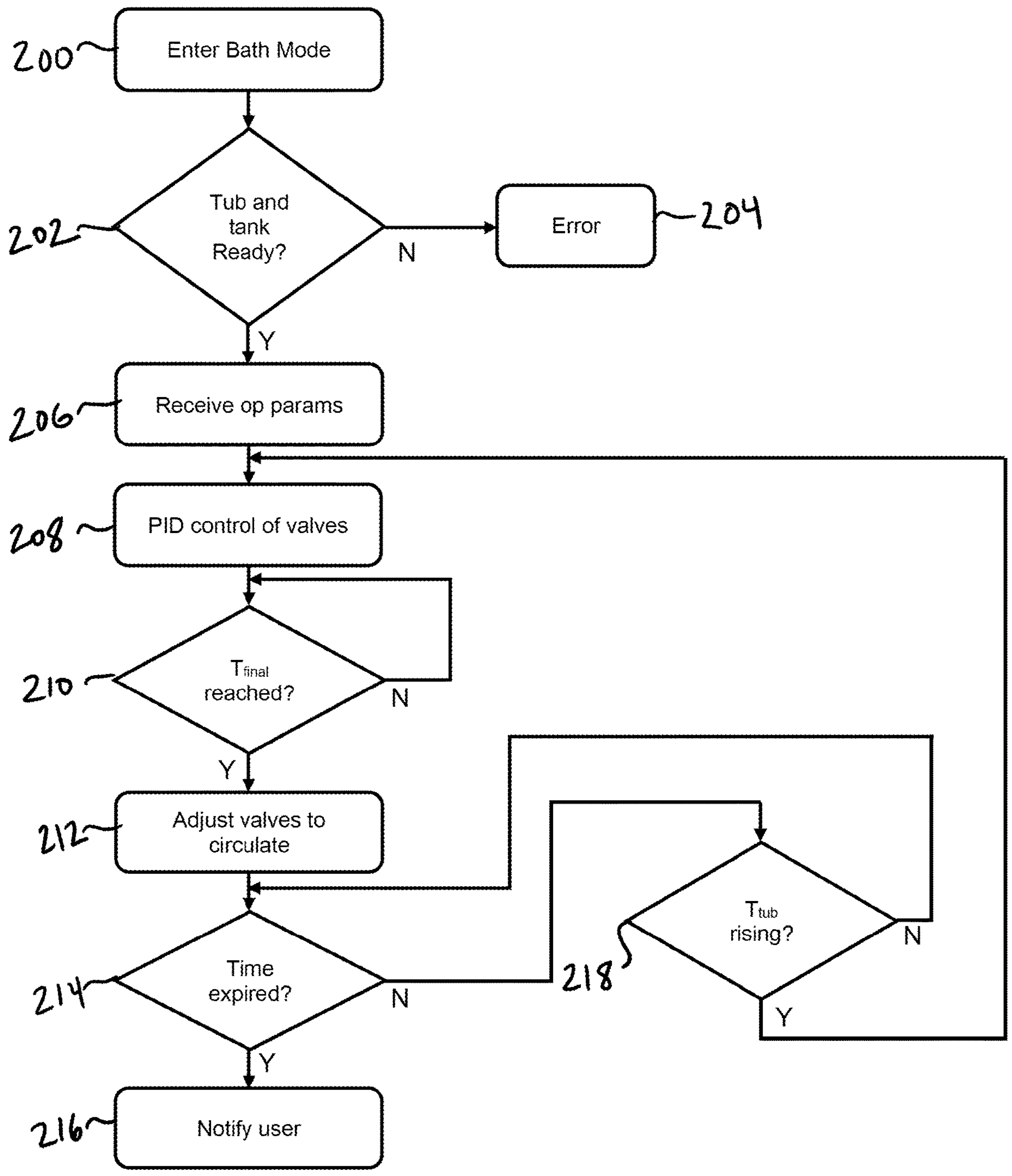
FIG. 7 is a flowchart representing an example method for a bath operation using the hydrotherapy system of FIG. 1.

An example main operation of the hydrotherapy system 10 is shown in FIG. 7. The controller U1 may enter a "Bath Mode" at step 200. This may be done in response to receiving an input from a user via a user interface 76, for example. However, entering the Bath Mode may be performed based on an established schedule, in response to presence detection of a patient in the tub 12, or other like criteria. Preferably, the controller U1 will not allow the hydrotherapy system 10 to enter the Bath Mode unless the tub 12 and the cold water tank 18 are "ready," i.e., their setpoint temperatures have been reached. For example, after receiving a request to enter Bath Mode at step 200, the controller U1 may check at step 202 to make sure the tub 12 and cold water tank 18 are "ready." If not, the controller U1 may output an error, via a user interface 76 or the like, at step 204. In some embodiments, the controller U1 may prevent the user from selecting Bath Mode before the controller U1 has determined that the tub 12 and cold water tank 18 are ready, effectively reversing steps 200 and 202. The patient may enter the tub 12 when the tub 12 is "ready," although the patient may also choose to immerse him or herself in the tub 12 during the heating process, if desired.

If the controller U1 determines that the Bath Mode may commence, at step 206, the controller U1 may receive one or more operating parameters. Such operating parameters may be, for example, a starting temperature for the water in the tub 12, a time period to hold at the starting temperature, an ending temperature for the water in the tub 12, a time period to hold the ending temperature, a rate of change of temperature over time, and/or other like parameters. One or more of the operating parameters may be directly selected by the user via the user interface 76—e.g., a user may select 50° F. as the ending temperature for water in the tub 12. Parameters may also be selected indirectly. For example, the controller U1 may present the user with preset programs for selection, whereby selection of a particular program has one or more preset parameters affiliated therewith. Still other parameters may be automatically provided from sensor data or other like sources. For example, the starting temperature for water in the tub 12 may be a measured temperature from one or more of the tub temperature sensors 80 at the time the Bath Mode is entered. Still other parameters may be pulled from memory U2, received from external devices, or the like. The operating parameters utilized by the controller U1 and the origin of each may be varied.

The controller U1 may control the cooling of the water in the tub 12 using at least the transfer pump 54, the mixing valve 64, and the balance valve 66. For example, the controller U1 may use, at step 208, PID or similar logic, based on one or more of the received operating parameters as well as data feedback from various components, including but not limited to the tub temperature sensor(s) 80, to adjust flow rates and volumes of water that are fed to the tub 12 and returned to the cold water tank 18. In one example, a faster rate of change parameter will entail allowing more water from the cold water tank 18 to enter the mixing valve 64, while requiring more of the water from the tub 12 entering the return opening 30 to be diverted to the cold water tank 18 via the balance valve 66. Cooling times and rates can be determined from historical data, estimated using conventional thermodynamic equations and the selected parameters, or the like. The controller U1 may adjust the positions of the mixing and balance valves 64, 66 as necessary during operation to ensure the desired change rates and temperatures are accomplished.

At step 210, the controller U1 may monitor the temperature $T_{tub}$ of the water in the tub 12 to determine whether the set ending temperature $T_{final}$ is reached. In the example shown in the figures, the controller U1 may rely on the temperature reading from the tub temperature sensor 80*b* adjacent the return opening 30. However, data from other sensors 80 can be read in the alternative. In other embodiments, data from multiple sensors may be averaged or otherwise combined to measure the temperature $T_{tub}$ of the water in the tub 12. Once the ending temperature $T_{final}$ is reached, at step 212, the controller U1 may close the mixing valve 64 to the cold water intake 52 and close the balance valve 66 to allow recirculation of the water in the tub 12 under the influence of the transfer pump 54. In some embodiments, if recirculation is not necessary upon reaching the ending temperature $T_{final}$, then the transfer pump 54 may also be deactivated.

While not shown in FIG. 7, the controller U1 may also be monitoring the temperature of the water in the cold water tank 18, e.g., via the tank temperature sensor(s) 82, during normal operation. If the temperature of the water in the cold water tank 18 exceeds a threshold (e.g., a preset value or a temperature that may interfere with the desired operations or prevent achievement of certain parameters such as desired change rate), chilling operations similar to those described earlier may be utilized to reduce the temperature in the cold water tank 18.

Upon reaching the ending temperature $T_{final}$, as previously mentioned, the controller U1 may be set to allow the tub 12 to remain at that temperature for a period of time. For example, the user may wish to remain in the tub 12 for 15-20 minutes at 50° F. to obtain the benefits of cold water therapy. In such instances, the controller U1 will, at step 214, monitor whether the set time period has expired. If the time period expires, the controller U1 may, at step 216, notify the user via a user interface 76 (e.g., an audible or visual alert) or the like. If the time period has not yet expired, at step 218, the controller U1 may check that the temperature $T_{tub}$ in the tub 12 has not risen above the ending temperature $T_{final}$ beyond a selected or preset threshold. If not, the controller U1 may continue to watch the time and temperature. If the temperature $T_{tub}$ of the water in the tub 12 gets too high, the controller U1 may return to step 208, reentering PID or other logic control to manipulate the mixing and balance valves 64, 66 to allow more water from the cold water tank 18 to enter the tub 12, to bring the temperature back down to the ending temperature $T_{final}$.

After step 216, the user may exit the tub 12 or remain in the tub 12 as it warms back up. The controller U1 may continue to run the transfer pump 54 to recirculate the water in the tub 12 (e.g., for filtering, sanitizing, and/or the like). In addition, the chilling and heating operations described above in FIGS. 6A-6C may be entered again (either automatically or upon selection by a user) to restore the hydrotherapy system 10 to a ready state for the next user.

The hydrotherapy system 10 may include a "Standby Mode," which may be used for short shutdowns without turning off power. This may be used to stop heating and cooling cycles but not drain either the tub 12 or the cold water tank 18. In this mode, the controller U1 may deactivate the cooling and heating elements 40, 72, and shut down the chiller and transfer pumps 42, 54. The controller U1 may periodically exit standby merely to circulate water (by initiating one or both of the chiller and transfer pumps 42, 54) to avoid stagnation. After a period of circulation, the controller U1 may reenter standby.

A full shutdown of the hydrotherapy system 10 may further include the controller U1 opening the emergency drain valve 38 to empty the tub 12. As in the example described earlier, removing power from the emergency drain valve 38 may allow it to open if it is a normally open valve. In other embodiments, the controller U1 may signal or provide power to the emergency drain valve 38 to cause it to open. The controller U1 may lock out the transfer pump 54 during draining to prevent damage thereto. In full shutdown, water may remain in the cold water tank 18, which may be effectively sealed and therefore less subject to issues relating to standing water. However, if the cold water tank 18 is also to be emptied, the user may actuate the emergency valve 49.

The controller U1 may receive, either as an input from a user or from monitoring via one or more sensors, an indication of one or more emergency conditions that can trigger an emergency stoppage. For example, the hydrotherapy system 10 may be equipped with an emergency off button (not shown) that can be pressed by a user in case of an observed emergency. When the controller U1 detects the emergency off button has been pressed, the controller U1 may cut power to the emergency drain valve 38 as well as to other subsystems servicing the hydrotherapy system 10, such as the chilling and heating loops, the pumps 42, 54, and/or the like. With water drained from the tub 12 and power removed, it can be safe to recover a patient from the tub 12. In other embodiments, the emergency off button may simply be a power shut-off that does not send a signal to the controller U1 but simply breaks the electrical circuits within the system 10.

The controller U1 may also detect emergency conditions using one or more sensors such as those already described above or other sensors (not shown). For example, the controller U1 may drain the tub 12 and/or cut power within the hydrotherapy system 10 in response to detecting emergencies such as: electrical faults, tub water temperatures out of acceptable ranges, patient occupancy time limit exceeded, unexpected water levels (indicating either a leak or a drainage malfunction), pump, sensor or valve failures, or the like. In still further embodiments, the controller U1 may be in communication with one or more physiological sensors (not shown) worn or attached to the patient in the tub 12. Upon detecting a physiological parameter of the patient outside of acceptable tolerances, the controller U1 may initiate an emergency shutdown. Examples of physiological sensors for use with the hydrotherapy system 10 include heart rate monitors, pulse oximeters, respiration rate sensors, blood pressure sensors, thermometers, glucose sensors, combinations thereof, or the like.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined herein.

We claim:

1. A hydrotherapy system comprising:

a tub having a rim at least partially surrounding an upper edge of a bowl;

one or more fill jets in fluid communication with the bowl;

a return opening formed in the tub and in fluid communication with the bowl;

a return line in fluid communication with the return opening;

a cold water tank;

a cold water intake in fluid communication with the cold water tank;

a transfer pump having an inlet configured to be in variable fluid communication with the return line and the cold water intake and an outlet configured to be in fluid communication with the one or more fill jets; and at least one mixing valve located upstream of the transfer pump and configured to control a first flow rate through the return line and a second flow rate through the cold water intake such that the first flow rate and the second flow rate constitute a total flow rate reaching the inlet of the transfer pump.

2. The hydrotherapy system of claim 1, further comprising a controller in communication with the transfer pump and the at least one mixing valve.

3. The hydrotherapy system of claim 2, further comprising at least one temperature sensor configured to monitor at least one of a temperature of water entering the tub through the one or more fill jets or water leaving the tub through the return opening.

4. The hydrotherapy system of claim 3, wherein the controller is configured to adjust a position of the at least one mixing valve to control the first and second flow rates based on signals received by the controller from the at least one temperature sensor.

5. The hydrotherapy system of claim 1, further comprising:

a chiller unit; and a chiller pump configured to circulate water in the cold water tank between a chiller flow outlet and a chiller flow inlet in the cold water tank such that the chiller unit operates to chill the water in the cold water tank.

6. The hydrotherapy system of claim 5, wherein in one mode of operation, the at least one mixing valve is positioned such that the first flow rate is non-zero and the second flow rate is zero, and heat generated by a condenser of the chiller unit is passed to water recirculating to the tub through the return line.

7. The hydrotherapy system of claim 5, wherein the cold water tank includes a plurality of dividing plates arranged to form a labyrinth path within the cold water tank, the chiller flow inlet being disposed at one end of the labyrinth path and the chiller flow outlet being disposed at an opposite end of the labyrinth path.

8. The hydrotherapy system of claim 5, wherein the chiller unit includes a condenser with a coil that dissipates heat generated by the chiller unit to ambient air without affecting a temperature of water in the tub.

9. The hydrotherapy system of claim 1, wherein the tub is mounted on top of the cold water tank.

10. The hydrotherapy system of claim 1, further comprising a lid movable attached to the tub.

11. The hydrotherapy system of claim 1, further comprising a filter is located between the cold water intake and the one or more fill jets.

12. A method for operating a hydrotherapy system, the hydrotherapy system including a tub containing water, one or more fill jets in fluid communication with the tub, a return opening in fluid communication with the tub, a return line in fluid communication with the return opening, a cold water tank containing water at a lower initial temperature than a starting temperature of the water in the tub, a cold water intake in fluid communication with the cold water tank, a transfer pump having an inlet and an outlet in fluid communication with the one or more fill jets, at least one mixing valve upstream of the transfer pump, and a controller, the method comprising:

receiving, by the controller, operating parameters, the operating parameters including at least a final temperature for the water in the tub and a holding time for maintaining the final temperature;

operating, by the controller until the final temperature is reached, the at least one mixing valve to adjust a first flow rate from the return line to the inlet of the transfer pump and a second flow rate from the cold water intake to the inlet of the transfer pump based at least on the operating parameters;

positioning, by the controller upon the final temperature being reached, the at least one mixing valve to prevent flow from the cold water intake to the inlet of the transfer pump and allow only flow from the return line to the inlet of the transfer pump; and notifying a user, by the controller upon expiration of the holding time, that the holding time has expired.

13. The method of claim 12, wherein prior to expiration of the holding time, the controller is configured to determine whether a temperature of water in the tub has risen above the final temperature by more than a threshold value.

14. The method of claim 13, wherein if the temp of water in the tub exceeds the final temperature by more than the threshold value, the controller is configured to adjust a position of the at least one mixing valve to change the first and second flow rates.

15. The method of claim 12, wherein the operating parameters are received by the controller from a user interface.

16. The method of claim 12, wherein the operating parameters further include at least one of a starting temperature for water in the tub, a time period to hold the starting temperature, or a rate of change of temperature over time.

* * * * *